ERNEST W. ROTH
PAUL W. PRUTZMAN
INVENTORS

ATTORNEY

Jan. 31, 1933.                E. W. ROTH ET AL                 1,895,683
            APPARATUS FOR TREATING AN OILY LIQUID WITH AN AQUEOUS LIQUID
                        Filed Nov. 4, 1930      3 Sheets-Sheet 2
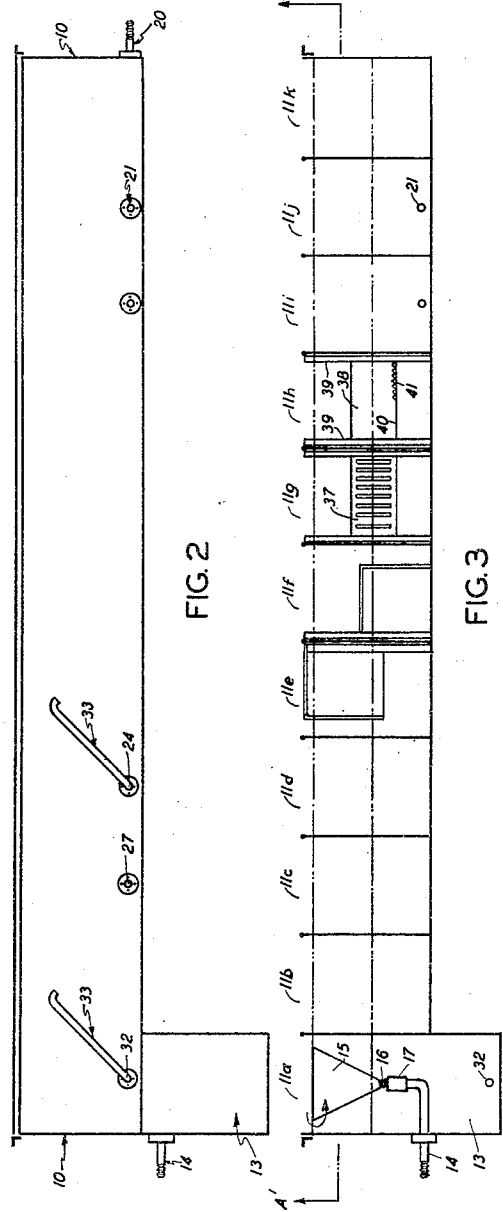
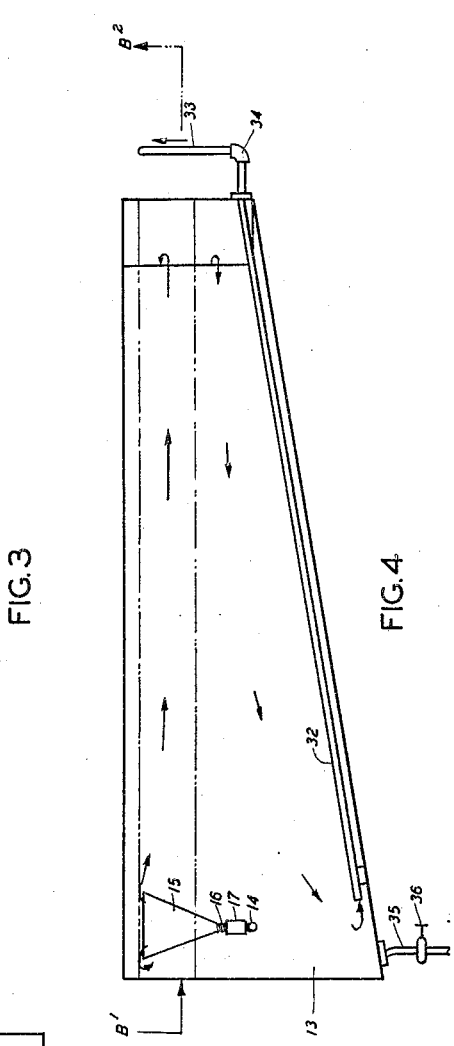
ERNEST W. ROTH
PAUL W. PRUTZMAN
           INVENTORS
           ATTORNEY Jan. 31, 1933.  E. W. ROTH ET AL  1,895,683
APPARATUS FOR TREATING AN OILY LIQUID WITH AN AQUEOUS LIQUID
Filed Nov. 4, 1930   3 Sheets-Sheet 3

ERNEST W. ROTH
PAUL W. PRUTZMAN
INVENTORS

Paul W. Prutzman
ATTORNEY

Patented Jan. 31, 1933

1,895,683

UNITED STATES PATENT OFFICE

ERNEST W. ROTH AND PAUL W. PRUTZMAN, OF LOS ANGELES, CALIFORNIA

APPARATUS FOR TREATING AN OILY LIQUID WITH AN AQUEOUS LIQUID

Application filed November 4, 1930. Serial No. 493,336.

An object of our invention is to provide means for bringing into chemically reactive contact two mutually immiscible liquids, such as an oil body and an aqueous solution.

An object of our invention is to produce such contact by counter flow, bringing the strongest solution into contact with the most treated oil and fresh oil into contact with the most exhausted solution.

An object of our invention is to produce reactive contact between such liquids as tend strongly to emulsify without incurring the risk of producing an emulsion.

An object of our invention is to bring the reaction product into solution in the aqueous liquid in cases where such product tends to separate from both the treated and the treating liquid.

It is well known that certain tars resulting from the destructive distillation of coal contain phenols and similar bodies which unite with sodium hydroxid to form water soluble salts which may be broadly classed as phenolates. It is customary to separate the phenols from coal tar distillates by agitating these distillates with an aqueous solution of sodium hydroxid, parting the settled solution from the oil and precipitating the phenols by contacting with carbon dioxid, by which the sodium is carbonated and the phenols are set free. The object in this case is the recovery of the phenols with the smallest possible consumption of alkali.

Likewise, when petroleum distillates are treated with strong sulfuric acid and the acid tar removed, the oil contains a variety of acid bodies which must also be removed before the oil is fit for use. These bodies comprise: a residue of free sulfuric acid and of acid sludge, suspended in the oil; phenols and other organic acids existing in the raw distillate and not removed by the acid treatment; alkyl sulfuric acids and sulfonic acids resulting from the action of the acid on unsaturated hydrocarbons, and entrained or dissolved sulfur dioxid.

All of these bodies unite freely with dilute aqueous alkali (as sodium hydroxid) to form sodium salts, the mixture of reaction products when separated from the oil being known colloquially as "soap". This product has very little value and the object of the alkali treatment as applied to petroleum is not the recovery of the soap but rather the neutralization and purification of the treated oil.

The more limpid and volatile petroleum distillates may as a rule be completely neutralized and cleansed by agitation with an alkaline solution followed by vigorous washing with water, but the products of cracking operations and the more viscous distillates such as lubricating oils require less energetic treatment to avoid the formation of persistent emulsions. For this there are several reasons, for example—the lubricating oil soaps, which are freely soluble in water are less soluble in alkaline solutions and may be separated in a flocculent or gelatinous form if the solution exceeds a certain (but not constant) concentration—the reaction between the acid bodies and the alkali takes place in the oil phase and the reaction product must be hydrated and precipitated from the oil before it can dissolve in the aqueous phase—during this hydration and precipitation the soap tends strongly to occlude a material quantity of oil which, on solution of the soap, separates into microscopic particles which part from the aqueous phase very slowly—and finally, some of the reaction products are more soluble in oil than in water or aqueous alkali, though as a rule they are also more soluble in a solution of these soaps than in the oil.

A consideration of these principles leads to the expectation, which is confirmed by experience, that many acid treated oils will be difficult or impossible to neutralize and wash by agitation without severe and highly variable losses of valuable material and without the risk of completely emulsifying and losing occasional entire batches.

By the apparatus and methods about to be described we are enabled to completely neutralize acidified oils and to completely extract the reaction products therefrom without the loss of any oil and without risk of emulsification. We are also enabled to conduct the neutralization and washing operations continuously and with but a trifling amount of regulation or attention.

An apparatus suitable for the practice of my invention is illustrated in the attached drawings, in which Fig. 1 is a plan view of the neutralizing and washing pan;

Fig. 2 is a frontal elevation of the same;

Fig. 3 is a section on the line A1—A2 of Fig. 1;

Fig. 4 is a vertical section on the line B1—B2 of Fig. 1;

Figure 1:
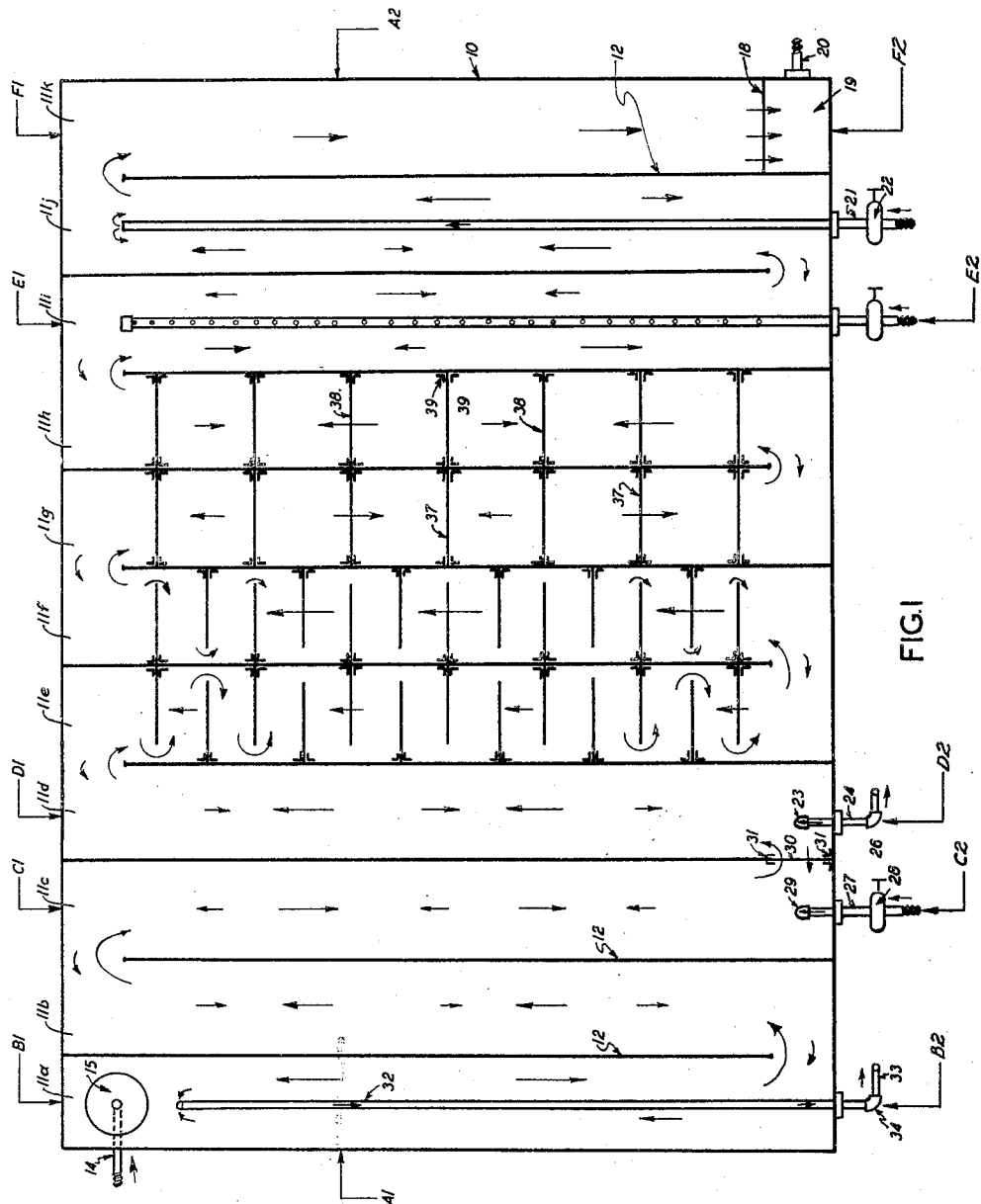

Referring to the figures, the apparatus consists first of a large shallow box or tray 10 which may well be constructed of galvanized sheet iron, which may be soldered. This tray is divided into a number of long and relatively narrow troughs 11a—11b etc., by means of partitions 12 which reach from top to bottom of the tray but leave an opening at alternative ends. Through these troughs the oil and the alkali solution (and water) are flowed in contrary directions, the aqueous liquid forming a lower and the oil an upper layer.

The oil inlet end of the tray may desirably have a single trough 11a which is deeper at one end than the remainder of the tray. This is shown at 13 in Figs. 2, 3 and 4. The acid oil is admitted to this trough through a pipe 14 and a funnel 15, the top of the funnel being situated at substantially the upper liquid level which is to be maintained in the tray. This level may be varied if the funnel is provided with a long thread 16 running in a threaded sleeve 17 so that the funnel may be screwed up and down. The oil is thus introduced on top of the aqueous liquid, which at this point is lying quiescent, so that it may free itself from any traces of suspended oil without agitation or disturbance. The deep trough is provided for the purpose of greatly retarding the flow of the aqueous liquid.

Figure 8:
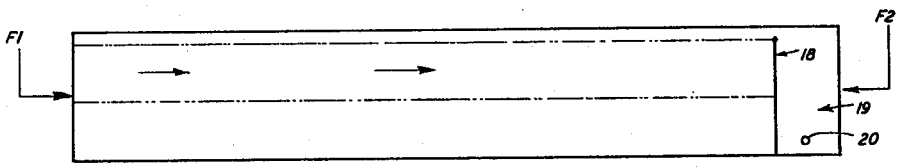
Fig. 8 is a vertical section on the line F1—F2 of Fig. 1.

The upper or oil layer flows in a tortuous course through the various troughs constituting the tray, as indicated by the long arrows shown in Fig. 1. It finally passes through trough 11k and over the weir 18 (Figs. 1 and 8) into a pocket 19 from which it passes through a pipe 20 to any receptacle for clean oil not shown. The height of this weir fixes the upper liquid level in the tray.

Figure 6:
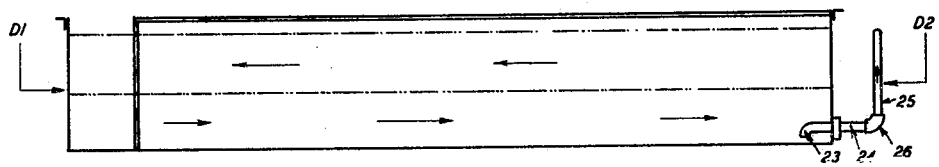
Fig. 6 is a vertical section on the line D1—D2 of Fig. 1.
Figure 7:
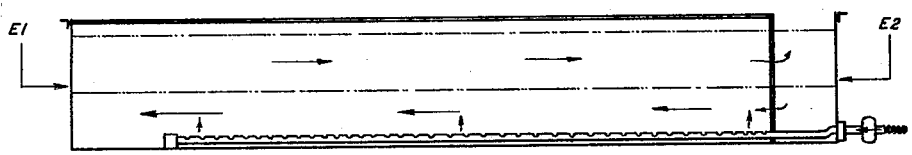
Fig. 7 is a vertical section on the line E1—E2 of Fig. 1.

The lower or aqueous layer flows in a contrary tortuous course through the troughs, as indicated by the short arrows shown in Fig. 1. In trough 11k (see Fig. 8) no aqueous liquid is introduced as this trough is reserved for the final settlement of traces of water from the oil. In trough 11j water is introduced at the bottom through a pipe 21 controlled by a valve 22. The layer of water thus formed counterflows the oil to trough 11d (see Fig. 6) where it is withdrawn through a downturned L 23, a nipple 24 and a swing pipe 25, the latter swivelling on an L 26 so that its end may be raised or lowered. If this swing pipe be set at the correct height (slightly below the upper surface of the oil in the tray) it will discharge the total flow of water without draining any oil.

An alkaline solution of the desired strength is introduced into trough 11c (see Fig. 5) through a pipe 27 controlled by a valve 28, the pipe preferably terminating in a downturned L 29. Troughs 11c and 11d are separated by means of a slide 30 retained in the grooves 31. This slide should extend slightly above the upper surface of the two aqueous liquids (the height of which will be the same on each side) but not high enough to impede the flow of oil over it.

The alkaline solution counterflows the oil stream through troughs 11c, 11b and 11a, and is finally withdrawn from the tray through a pipe 32 and a swing pipe 33 swivelling on the L 34.

On entering trough 11a the acid oil, which may contain some "pepper acid" or finely divided acid sludge, is brought into contact with a practically exhausted alkaline solution containing salts resulting from prior neutralization of acid bodies. On such contact this pepper acid is precipitated, sinks to the lower part of the trough and may from time to time be withdrawn through pipe 35 and valve 36.

Passing in succession through troughs 11a, 11b and 11c the oil is contacted with progressively fresher and stronger alkali (which is flowing in the opposite direction) and by the time it reaches the further end of trough 11c its acid content will be completely neutralized. A part of the resultant soap will be dissolved in the alkali, a part will form a thin layer between alkali and oil and a part will remain dissolved or suspended in the oil. The volume relation between these portions will vary widely with the nature and acidity of the oil and is immaterial at this point. Such part of the soap as dissolves in the alkali will be carried out of the system through pipe 33 and such parts as form an intermediate layer or remain in the oil are positively carried forward into trough 11d for treatment with water.

Sufficient time must be allowed and sufficient contact must be afforded to permit complete neutralization of the acids in this first stage of the treatment. Contact time is a factor of depth of oil layer into flow rate times length of passage and may be controlled by feed. Further, contact area may be increased in ways to be described, based on setting up convection currents or eddies or by increasing relative velocity.

Passing over the gate 30 the stream of neutralized oil and soap encounters a counterflowing stream of soap solution resulting from prior contact of water with the oil and which, at this point, is escaping from trough 11$d$ through pipe 25. By this initial contact any soap remaining suspended in the oil is hydrolized and caused to settle into the intermediate layer and finally into the water, in which it dissolves without carrying any oil with it. Flowing along troughs 11$d$, 11$e$ and so on through trough 11$j$ the oil layer is contacted with progressively purer water, the soap being thus gradually eliminated and passed into the counterflowing water stream.

The oil finally passes into the end trough 11$k$ where it is afforded an opportunity to settle completely and finally passes over weir 18 into the finished oil outlet 20.

It will be understood that the number and the relative proportions of the troughs shown in the figure are purely illustrative and that the apparatus will be, in practice, proportioned to the kind of oil to be treated and to the capacity required. In particular, the depth of the respective layers is considerably exaggerated in the drawings, the rate of flow of such thick layers being too slow to afford the most effective contact between the two layers.

If in any given apparatus the extent of contact is not sufficient to produce a complete neutralization or a satisfactory washing of the oil at the desired rate of flow, several means for increasing contact are available. These are all designed to break and disturb the plane of contact between oil and aqueous liquid. This plane is liable to accumulate the mentioned intermediate layer of precipitated soap which, in its hydrolized condition, is often of a gelatinous consistency and not readily brought into solution.

Thus in trough 11$i$ we show a pipe lying along the bottom and having upward looking perforations, which should be of very small diameter. If such a pipe be located near the oil outlet end of the apparatus, where the oil has already been largely deprived of soap, this pipe may be supplied with air under pressure and the water thus thoroughly agitated with the oil before the latter passes to the settling trough 11$k$. This treatment would be too strenuous for oil containing considerable soap, as it might lead to emulsification, and a moderated action may be produced in such case by supplying the pipe with water under a low pressure, the needle jets of water thus ejected causing the water layer to well up and gently wash the oil.

A highly desirable breaking up and dissemination of the intermediate soap layer may be produced by the baffles shown in Figs. 1 and 3 in troughs 11$e$ and 11$f$. In the former the soap layer is caused to string through narrow vertical slots in baffles 37 which are placed across the contact line, the viscosity of the soap causing it to be retarded and banked up by the baffle and the lower portion of the strip passing through the slot being thus forced beneath the surface of the water. A strip of wire screen of say ⅛″ mesh may be used with substantially the same result.

In the latter a plain baffle 38 is used which forces the soap layer to pass, at least in part, under its lower edge, this effect being accentuated if the baffle is sloped so that its lower edge is downstream to the water flow. These baffles, which need be no more than strips of light sheet metal, may be slid into slots formed by opposing two very light angle irons 39—39, and may readily be so adjusted in height as to cause all the soap to pass under their lower edge and thus be contacted with the aqueous layer. The lower edge may be straight as indicated at 30 or serrated as indicated at 41 in Fig. 3.

The efficiency of contact may also be increased by increasing the velocity of one or both of the liquids. In trough 11$e$ (Figs. 1 and 3) a wing baffle is shown which obstructs the passage of only the oil, causing it to take a circuitous course through each individual trough while the aqueous liquid flows beneath it in a straight line. In trough 11$f$ the baffle is shown as obstructing the course of the aqueous liquid and, if the baffle be of the same depth as the trough, the maximum effect of increasing the velocity of both liquids is obtained. By proper spacing and immersion of such baffles, according to the nature of the materials, eddy currents may be set up by which a highly effective contact may be obtained without any danger of producing an emulsion or a persistent suspension of either liquid in the other.

Figure 5:
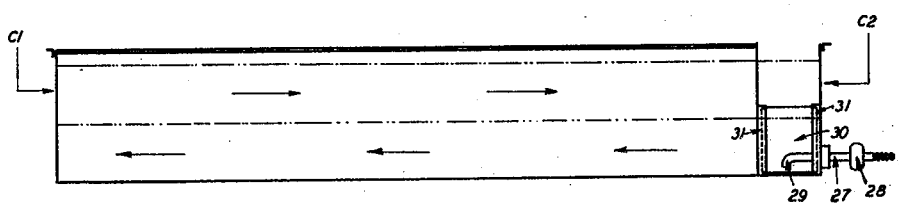
Fig. 5 is a vertical section on the line C1—C2 of Fig. 1.

In most cases it is desirable to withdraw the wash water at 24 before adding alkali at 27, as the addition of alkali will often throw the dissolved soap out of solution. In such case the slide 30 is closed as indicated in Fig. 5. In some cases, however, the wash water reaching outlet 24 will carry material quantities of oil, due to excessive agitation or disturbance in the water washing troughs. In such case the slide may be withdrawn and swing pipe 25 sufficiently raised to prevent the outflow of water. The soap solution will thus be detoured into contact with the entering alkali solution, by which the entrained oil will be rejected and caused to rise into the supernatant oil layer, while the soap will pass to the outlet 33 along with the alkali.

It will be understood that any or all of the above described disturbing or accelerating means may be applied in any or all of the troughs as they may be required in specific cases and that the most flexible and generally useful apparatus will be supplied with baffle slots and with air and water connections in each trough for use in such combination as may be found to give the best results in each instance.

We claim as our invention:

1. Apparatus for treating an oily liquid with an aqueous liquid, comprising: a series of adjoining troughs communicating at alternate ends; a pipe for introducing an aqueous liquid entering one end of said series and a pipe for withdrawing said liquid connected to the opposite end of said series; means for introducing an oily liquid over said aqueous liquid at last said end of said series and means for withdrawing said oily liquid from over said aqueous liquid at first said end of said series, whereby said oily liquid is caused to counterflow over the surface of said aqueous liquid throughout said series.

2. Apparatus for treating an oily liquid with an aqueous liquid, comprising: a series of adjoining troughs communicating at alternate ends; means including inlet and exit pipes each directly communicating with one of said troughs for flowing a layer of aqueous liquid over the bottom of said series in one direction and means including inlet and exit pipes, each directly communicating with one of said troughs for flowing a layer of oily liquid over said aqueous layer in an opposite direction, whereby said liquids are continuously contacted at the substantially horizontal interface of said layers.

3. Apparatus substantially as and for the purpose set forth in claim 2, including funnel means for introducing a flow of oil into said oily layer without disturbing said aqueous layer, said funnel being arranged for upward flow of oil therethrough.

4. Apparatus substantially as and for the purpose set forth in claim 2, including a trough materially deepened at the end at which said oily liquid is introduced, and means for withdrawing aqueous liquid from the deeper end thereof without disturbing the flow of said oily liquid.

5. Apparatus susbtantially as and for the purpose set forth in claim 2, including means located intermediate the ends of said series for withdrawing an aqueous liquid and substituting another aqueous liquid therefor.

6. Apparatus substantially as and for the purpose set forth in claim 2, including means located intermediate the ends of said series for introducing a second aqueous liquid into the flowing layer of first said aqueous liquid.

7. Apparatus substantially as and for the purpose set forth in claim 2, including means for disturbing the interface between said layers for increasing the area of contact between said layers.

8. Apparatus substantially as and for the purpose set forth in claim 2, including baffle plates affixed to alternate sides of a trough for increasing the rate of flow of one of said liquids.

9. Apparatus substantially as and for the purpose set forth in claim 2, including baffle plates affixed to alternate sides of a trough for increasing the rate of flow of said liquids.

10. Apparatus substantially as and for the purpose set forth in claim 2, including baffles across a trough and extending above and below the interface between said layers.

11. Apparatus substantially as and for the purpose set forth in claim 2, including baffles across a trough and extending above and below the interface between said layers, the lower edges of said baffles being serrated.

12. Apparatus substantially as and for the purpose set forth in claim 2, including perforate baffles across a trough and extending above and below the interface between said layers.

13. Apparatus substantially as and for the purpose set forth in claim 2, including a perforate pipe laid longitudinally in the bottom of a trough and means for introducing a fluid into said pipe.

In witness that we claim the foregoing we have hereunto subscribed our names this 28th day of Oct., 1930.

ERNEST W. ROTH.
PAUL W. PRUTZMAN.